Patented Oct. 6, 1953

2,654,779

UNITED STATES PATENT OFFICE 2,654,779

METHOD OF PREPARATION OF GUANIDINO FATTY ACIDS

Bruno Vassel and Roger Garst, Toledo, Ohio, assignors to International Minerals & Chemical Corporation, a corporation of New York No Drawing. Application December 23, 1950, Serial No. 202,574

16 Claims. (Cl. 260—534)

The invention relates to the preparation of N-guanidino substituted amino compounds. More particularly, it relates to the preparation of guanidino substituted acids utilizing alpha amino acids as a raw material. Still more particularly, it relates to a method for the manufacture of alpha guanidino substituted fatty acids such as glycocyamine.

A number of processes are known whereby alpha guanidino substituted fatty acids may be prepared. Glycocyamine, for example, may be prepared by heating guanidine carbonate with glycine at temperatures which will drive off water and carbon dioxide. Glycocyamine may also be prepared by the reaction of glycine with cyanamide in the presence of ammonia. In still another method, glycocyamine is prepared by the reaction of thiourea with an alkyl halide.

The first reaction gives poor yields of glycocyamine, generally in the range of 25% to 40%, based upon theoretical yield; maximum reported yields for the second reaction are 60% to 65%; and for the third reaction are 73% to 78%. While the third process gives higher yields, it has met with limited acceptance because of the expense of the alkyl bromide reagents, solvent requirements, and the difficulty of removing alkyl mercaptans in order to purify the glycocyamine produced.

It is a primary object of this invention to provide a process for the manufacture of guanidino type of compounds which overcomes the limitations and disadvantages of processes heretofore utilized.

A further object is to provide a process giving higher yields of alpha guanidino substituted fatty acids than have been obtained heretofore.

A still further object of the invention is to provide a process wherein various alkali hydroxides and ammonia hydroxide may be utilized interchangeably.

A still further object is to provide a process utilizing conditions of manufacture which eliminate extraction of color bodies from commercial cyanamide.

It is a still further object of the invention to provide a process wherein formation of color bodies during the glycine-cyanamide reaction is eliminated, thus simplifying the glycocyamine purification.

It is another object of the invention to provide a process giving high yields of glycocyamine.

These and other objects of the invention will appear to those skilled in the art as the description proceeds.

In its broad aspect, the process of this invention comprises reacting an amino compound having at least one replaceable hydrogen on the amino group and a cyanamide compound at an elevated temperature in the presence of controlled quantities of hydroxyl ion as catalyst, and crystallizing the reaction product from the solution mixture.

In one specific embodiment, the process comprises mixing with a solution of an alpha amino fatty acid a solution of cyanamide, adjusting the pH with a base, heating the mixture, and crystallizing glycocyamine from the solution mixture.

More in detail, the process is carried out by preparing a solution of cyanamide in which the cyanamide is present to the extent of at least a three molar solution. Preferably, a cyanamide solution is prepared having a cyanamide concentration of at least 4 mols per liter of solution because apparently the larger the amount of cyanamide up to 4 mols per unit volume of solution at any constant mol ratio of free cyanamide to alpha amino acid, the higher the yield of guanidino fatty acid.

By "solution of free cyanamide" is meant a solution in which this reactant is present uncombined with any metallic ions such as sodium, potassium, calcium, and the like. Cyanamide compounds useful for the purposes of this invention are cyanamide itself, phenyl cyanamide, and the like, when operating in an aqueous medium. The reaction may also be carried out in organic solvents in which the cyanamide derivatives such as cyanamide, phenyl cyanamide, benzyl cyanamide, diethyl cyanamide, ethyl butyl cyanamide, and similar cyanamides are dissolved, for example, in media such as alcohols, e. g., methyl alcohol, ethyl alcohol, propyl alcohol; ketones, e. g., acetone, methyl ethyl ketone, methyl propyl ketone, dibutyl ketone; ethers, e. g., ethyl ether, methyl ethyl ether, methyl isopropyl ether, dipropyl ether, and the like. Such cyanamide derivatives as are soluble in solvents other than water may be reacted with amines, amino fatty acids, and the like, provided the second reactant is at least partially soluble in the solvent.

When free cyanamide is extracted from crude calcium cyanamide with an aqueous acid solution, such as aqueous sulfuric acid, the free cyanamide solution is highly contaminated with color bodies if the pH of the extraction mixture is permitted to drop below about pH 7.0. Consequently, the preferred process is to stop the cyanamide extraction at about pH 7.5.

If a solution of cyanamide is prepared by extraction with dilute sulfuric acid, the filtrate, after removal of calcium sulfate, is a dilute solution which should be concentrated to the above mentioned molarities. Before concentration, if the solution pH is of the order of 7.0 to 7.5, the pH should be adjusted to the range of 4.8 to 5.0, the latter pH range being that of greater stability for free cyanamide. The concentration may then be carried out under subatmospheric pressure or so-called vacuum at a bath temperature in the range between about 60° C. and about 90° C. in order to reduce the losses of cyanamide due to decomposition and/or polymerization. By "subatmospheric pressures" we means pressures in the range of about 5 mm. to about 45 mm. of mercury, and preferably about 15 mm. to about 30 mm. mercury absolute.

The pH of the concentrated free cyanamide is adjusted prior to reaction with amino compounds by the use of any base such as, for example, sodium hydroxide, potassium hydroxide, calcium hydroxide, ammonium hydroxide, tributylamine, and the like, whereby a sufficient quantity of hydroxyl ions are present to catalyze the reaction. By addition of base, the pH of the solution of the reactants is adjusted to a starting pH not lower than 9 and not higher than 10, and preferably in the range between about 9.4 and about 9.6. Further, the pH of the reacting mixture at the end of the reaction should not exceed a pH of about 10.3 for good yields.

Another factor contributing to high yields is the mol ratio of amino compounds to free cyanamide. For example, the optimum yields of guanidino fatty acids are obtained when glycine and cyanamide are present in mol ratios in the range between about 1:2 and about 1:2.25. At ratios outside this range, as for example between about 1:1.25 to 1:1.75, yields are commercially acceptable but somewhat less than is obtained with the preferred mol ratios. At ratios greater than 1:2.25, excessive amounts of dicyanodiamide are formed.

Alpha amino acids such as glycine, sarcosine, N-ethyl glycine, N-formyl glycine, alanine, beta alanine, gamma aminobutyric acid, proline, phenylalanine, lysine, arginine, glutamic acid, aspartic acid, serine, isoleucine, leucine, cystine, methionine, alpha amino-beta-hydroxybutyric acid, tyrosine, alpha amino-isovaleric, alpha aminovaleric acid, and the like are useful for the purposes of this invention.

The mixture of reactants and catalyst is heated to a temperature in the range of about 60° C. to about 100° C., elevated temperatures which do not cause objectionable amounts of decomposition of cyanamide, and preferably in the range of about 90° C. to about 95° C. The reaction may be carried out either at atmospheric pressure or under supermatospheric pressure.

In order to drive the reaction to as near completion as possible, the solution is heated for a period in the range of about 1 hour to about 24 hours, the time being shortest at the higher temperatures. When operating in a closed system at 60° C., the time of heatiing is preferably about 12 hours.

At the end of the heating period, the reaction mixture is cooled to room temperature. At room temperature many of the guanidino substituted products can be recovered with yields in the neighborhood of 80%. Where the reaction product is extremely soluble in water, such as alpha guanidino propionic acid, some concentration by evaporation of the mother liquor, under vacuum at low temperatures, may be needed to obtain high yields.

After the crystalline product is obtained from the mother liquor, it may be purified by recrystallization, twice from water, or preferably once from methyl, ethyl, or butyl alcohol, and once from water. The alcohols are more efficient solvents for the dicyanodiamide side-reaction product than is water.

By this method, alpha guanidino acids such as glycocyamine, methyl glycocyamine, creatine, alpha guanidino propionic acid, alpha guanidino n-butyric acid, and the like, are prepared. Such compounds have utility as pharmaceuticals, alone or in combination with other compounds.

The invention will be further understood from a study of the following examples illustrating several embodiments of the invetnion and given without intention to limit the invention thereto.

*Example I*

Commercial calcium cyanamide containing approximately 53% of calcium cyanamide, or 27.8% free cyanamide equivalent, is suspended in water, the calcium cyanamide to water ratio being approximately 200 grams of commercial calcium cyanamide for each 800 grams of water. The calcium cyanamide solution is cooled to a temperature of at least 23° C. and is then mixed with 400 grams of 9 molar sulfuric acid solution (volume ratio of 1 volume of 95.5% sulfuric acid to 3 volumes of water), care being taken to insure that the solution temperature does not go above 25° C. and preferably not above 23° C. The titration creates a pH of approximately 7.5 which prevents the extraction of undesirable pigments, yet liberates essentially all of the free cyanamide. The solution is filtered to remove calcium sulfate and other impurities, and the filtered solution is adjusted with sulfuric acid to a pH of approximately 4.9. The filtrate is concentrated by distillation under a vacuum of 30 mm. of mercury absolute under conditions insuring that the internal vapor temperature does not exceed 43° C. Upon removal of sufficient water to produce a concentrate of approximately 200 cc. of solution per each 200 grams of calcium cyanamide extracted, the concentrate is filtered to remove calcium sulfate and produces a clear solution. To the clear solution is added approximately 30 grams of glycine per each 200 cc. of concentrate. To the mixture of cyanamide and glycine is added 50% sodium hydroxide to yield a reaction mixture of pH 9.4; this requires approximately 13 cc. per each 200 cc. of concentrate.

The cyanamide-glycine-hydroxide solution is heated in on open vessel at a temperature of approximately 95° C. and held at that temperature for approximately 1.5 hours. After the heat treatment, the solution is removed from the reaction chamber and the mixture cooled to room temperature without the addition of water, and held at that temperature for approximately 8 hours. The crystals of glycocyamine plus dicyanodiamide are separated from the mother liquor by filtration.

The precipitate is purified as follows: it is suspended in 180 cc. of water, held at 50° C. for 2 hours, and filtered at that temperature. The crystals are then boiled up briefly with 100 cc. of water, allowed to cool to room temperature, and filtered.

Example II

The concentrate of free cyanamide solution was prepared in the same manner as is described in Example I. To this free cyanamide solution was added 30 grams of glycine per each 200 cc. of free cyanamide solution.

To the mixture of cyanamide and glycine is added approximately 48 cc. of 28% ammonium hydroxide per each 100 grams of glycine added to give to the mixture a solution pH in the range of approximately 9.4 to 9.6.

The cyanamide-glycine-ammonium hydroxide solution is heated in an open vessel to approximately 90° C. (or 95° C.–100° C. in a closed vessel) and held at that temperature for approximately 1.5 hours. After the heat treatment, the solution is cooled to approximately 25° C., and purified as described in Example I.

Example III

The concentrate of free cyanamide solution was prepared in the same manner as is described in Example I. To this free cyanamide solution was added 30 grams of glycine per each 200 cc. of free cyanamide solution.

To the mixture of cyanamide and glycine is added about 5 cc. of tributylamine per each 200 cc. of cyanamide solution, an amount which is slightly in excess of that required for saturating 200 cc. of water at 90° C. to 95° C. This yields a reaction mixture of optimum pH of approximately 9.4 for the coupling reaction.

The cyanamide-glycine-tributylamine solution is heated in an open vessel at a temperature of approximately 95° C. and held at that temperature for approximately 10 to 16 hours. After the heat treatment, the solution is removed from the reaction chamber, and the mixture cooled to approximately 25° C., and treated as described in Example I.

Example IV

The impure crystals from Example I may also be purified as follows: the crystals are extracted with 250 cc. of boiling methanol, and filtered hot. The crystals are then treated with 100 cc. of boiling water and allowed to cool to room temperature before filtration. The resultant crystals are pure glycocyamine.

Example V

If the original extract pH adjustment was made at a pH below 7.0, considerable color matter is present in the glycocyamine crystals. The impure crystals may be purified as follows: the crystals are suspended in 2N hydrochloric acid in quantities slightly in excess of the theoretical calculated amount.

To this solution is added, at room temperature, activated charcoal, such as Darco KB, and the solution stirred for ten minutes. The solution is then filtered and produces a faintly yellow filtrate. This filtrate is then mixed with enough sodium hydroxide or preferably 28% ammonium hydroxide solution to raise the pH to approximately 8.0. The solution is then allowed to stand for approximately six hours before filtering. After filtering the precipitate is washed with cold water. This procedure gives glycocyamine of comparable purity to that obtained in Example I.

Example VI

After the reaction as set forth in Example I is complete, the mixture is filtered. The recovered precipitate is a mixture primarily of glycocyamine, dicyanodiamide, together with small quantities of urea and ammonium carbonate.

This reaction product is treated with approximately 1500 cc. of normal butanol saturated at 25° C. with respect to both glycocyamine and dicyanodiamide for each mol of cyanamide reacted by heating the butanol suspension to approximately 95° C. for about ten minutes, and then filtering while hot, and preferably before appreciable cooling has taken place. This action dissolves the dicyanodiamide, but dissolves substantially none of the glycocyamine. The residue is composed primarily of glycocyamine and water soluble impurities. The residue is then washed with an amount of water, which is approximately double the weight of butanol extracted residue, to produce a pure glycocyamine product.

The hot butanol filtrate is then cooled to room temperature, and substantially pure dicyanodiamide crystallizes out. The dicyanodiamide is recovered by filtration, and the filtrate is utilized as recycle liquid in the purification of additional quantities of reaction products.

Having thus fully described and illustrated the character of the invention, what is desired to be secured and claimed by Letters Patent is:

1. A process for the preparation of guanidino-type compounds which comprises dissolving an alpha amino fatty acid into a solution of a cyanamide, adjusting the pH of the solution with hydroxyl ions before heating to exceed 9.0, heating the mixture, and crystallizing the reaction product from the solution mixture.

2. A process for the preparation of guanidino-type compounds which comprises adding to an alpha amino fatty acid a solution of a cyanamide, adjusting the pH of the solution before heating to a pH in the range of between about 9.0 and about 10.0 with such quantity of hydroxyl ions that after reaction the pH will not exceed 10.3, heating said mixture, and crystallizing the guanidino fatty acid product from the resultant reacted mixture.

3. A process for the preparation of guanidino-type compounds which comprises dissolving into a solution of a cyanamide an alpha amino fatty acid, adjusting the pH with hydroxyl ions in the range between about 9.4 and about 9.7, heating said mixture, and crystallizing the guanidino fatty acid product from the resultant reacted mixture.

4. A process for the preparation of guanidino-type compounds which comprises dissolving into a solution a cyanamide and an alpha amino fatty acid, adjusting with hydroxyl ions to a pH in the range between about 9.4 and about 9.6, heating the mixture under superatmospheric pressure conditions, and crystallizing the guanidino fatty acid product from the resultant reacted mixture.

5. A process for the preparation of glycocyamine which comprises preparing a solution of free cyanamide, adding to the solution glycine and sodium hydroxide in quantities sufficient to cause the pH of the solution before heating to exceed 9.0 and after heating not to exceed 10.3, heating the mixture, and crystallizing the glycocyamine product from the resultant solution mixture.

6. A process for the preparation of glycocyamine which comprises preparing a solution of free cyanamide, adding to the solution glycine and ammonium hydroxide in quantities sufficient to cause the pH of the solution before heating to exceed 9.0 and after heating not to exceed 10.3, heating the mixture, and crystallizing the glycocyamine product from the resultant solution mixture.

7. A process for the preparation of glycocyamine which comprises preparing a solution of free cyanamide, adding to the solution glycine and potassium hydroxide in quantities sufficient to cause the pH of the solution before heating to exceed 9.0 and after heating not to exceed 10.3, heating the mixture, and crystallizing the glycocyamine product from the resultant solution mixture.

8. A process for the preparation of glycocyamine which comprises preparing a solution of free cyanamide and glycine, adjusting the pH of the solution by addition of such quantity of hydroxyl ions so that initially the pH will exceed 9.0 and after reaction the pH will not exceed 10.3, heating the mixture to a temperature in the range of between about 60° C. and about 90° C., and crystallizing the glycocyamine product from the resultant solution mixture.

9. A process for the preparation of glycocyamine which comprises preparing a solution of free cyanamide and glycine, adjusting the pH of the solution by addition of such quantity of hydroxyl ions so that initially the pH will exceed 9.0 and after reaction the pH will not exceed 10.3, heating the mixture to a temperature in the range between about 60° C. and about 90° C. for a period of 1 to 18 hours, the time varying inversely with the temperature, and crystallizing the glycocyamine product from the resultant solution mixture.

10. A process for the preparation of glycocyamine which comprises preparing a solution of free cyanamide of 3 molar minimum concentration, adding glycine to the solution, adjusting the pH of the solution with such quantity of hydroxyl ions that before heating the pH exceeds 9.0 and that after reaction the pH will not exceed 10.3, heating the mixture, and crystallizing the glycocyamine product from the resultant solution mixture.

11. A process for the preparation of guanidino-type compounds which comprises preparing a solution of free cyanamide of 3 molar minimum concentration, adding glycine in quantity to produce a mole ratio of glycine to cyanamide in the range between about 1 to about 1.75 and between about 1 to about 2.5, adjusting the pH of the solution with such quantity of hydroxyl ions that before heating the pH exceeds 9.0 and that after reaction the pH will not exceed 10.3, heating the mixture, and crystallizing the glycocyamine product from the resultant solution mixture.

12. A process for the preparation of glycocyamine which comprises treating an aqueous suspension of commercial calcium cyanamide with sulfuric acid, filtering off the calcium sulfate and insoluble material, concentrating the filtrate to produce a free cyanamide solution of 3 molar minimum concentration, adding to the concentrate glycine and sodium hydroxide in quantities sufficient to cause the pH of the solution before heating to exceed 9.0 and after heating not to exceed 10.3, heating the mixture, and crystallizing the glycocyamine product from the resultant solution mixture.

13. A process for the preparation of glycocyamine which comprises treating an aqueous suspension of commercial calcium cyanamide with sufficient sulfuric acid to produce a solution having a pH in the range between 7.0 and about 7.5, filtering off the calcium sulfate and insoluble material, adjusting the pH of the filtrate with acid to between about 4.8 and about 5.0, concentrating the filtrate to produce a free cyanamide solution of 3 molar minimum concentration, adding to the concentrate glycine and sodium hydroxide in quantities sufficient to cause the pH of the solution before heating to exceed 9.0 and after heating not to exceed 10.3, heating the mixture, and crystallizing the glycocyamine product from the resultant solution mixture.

14. A process for the preparation of glycocyamine which comprises treating an aqueous suspension of commercial calcium cyanamide with sufficient sulfuric acid to produce a solution having a pH in the range between 7.0 and about 7.5, filtering off the calcium sulfate and insoluble matter, adjusting the pH of the filtrate with acid to between about 4.8 and about 5.0, concentrating the filtrate to produce a free cyanamide solution of 3 molar minimum concentration at a temperature in the range between about 60° C. and about 90° C. under superatmospheric pressure, adding to the concentrate glycine in a quantity to produce a ratio of cyanamide to glycine of 2 to 1 and base in the form of 28% ammonium hydroxide solution to adjust the pH of the reaction mixture to an initial minimum 9.0, heating the mixture to approximately 60° C. in a closed system for about four hours, cooling the resultant mixture, filtering the precipitate from the mother liquor and recrystallizing the product to obtain a pure product.

15. A process for the preparation of glycocyamine which comprises treating an aqueous suspension of commercial calcium cyanamide with sufficient sulfuric acid to produce a solution having a pH in the range between 7.0 and about 7.5, filtering off the calcium sulfate and insoluble matter, adjusting the pH of the filtrate with acid to between about 4.8 and about 5.0, concentrating the filtrate to produce a free cyanamide solution of 3 molar minimum concentration at a temperature in the range between about 60° C. and about 90° C. under superatmospheric pressure, adding to the concentrate glycine in a quantity to produce a ratio of cyanamide to glycine of 2 to 1 and hydroxyl ions in the form of 28% ammonium hydroxide solution to adjust the pH of the reaction mixture to an initial minimum 9.0, heating the mixture to approximately 60° C. in a closed system for about four hours, cooling the resultant mixture, filtering the precipitate from the mother liquor, and extracting the precipitate with n-butanol to remove the alcohol soluble material and recover the glycocyamine crystals.

16. A process for the preparation of glycocyamine which comprises preparing a solution of free cyanamide, adding glycine to said solution, adjusting the pH of the resulting solution with such quantity of hydroxyl ions so that initially the pH will exceed 9 and so that after the reaction has been completed the pH will not exceed 10.3, heating the pH adjusted mixture until the reaction has proceeded to substantial completion, separating the crude precipitate from the reaction products, mixing said precipitate with n-butanol saturated at approximately 25° C. with respect to glycocyamine and dicyanodiamide, heating the suspension to approximately 95° C. for about 10 minutes, separating glycocyamine from the mixture while hot, washing the glycocyamine crystals with water, cooling the hot butanol solution to about room temperature, separating solid material from the cooled solution, and recycling the butanol for treatment of additional quantities of crude precipitate.

BRUNO VASSEL.
ROGER GARST.

References Cited in the file of this patent

UNITED STATES PATENTS

| Number | Name | Date |
|---|---|---|
| 1,967,400 | Fischl | July 24, 1934 |
| 2,425,341 | Paden et al. | Aug. 12, 1947 |

FOREIGN PATENTS

| Number | Country | Date |
|---|---|---|
| 285,873 | Great Britain | Feb. 24, 1927 |

OTHER REFERENCES

Strecker: Compt. Rend (Fr. Acad. Sci.), vol. 52, p. 1212 (1861).

Dakin, J.: Biol. Chem., vol. 44, pp. 499–522 (1920).

Baumann et al.: Beilstein (Handbuch, 4th ed. 2nd sup.) vol. 4, p. 477 (1929).